Figure 1:
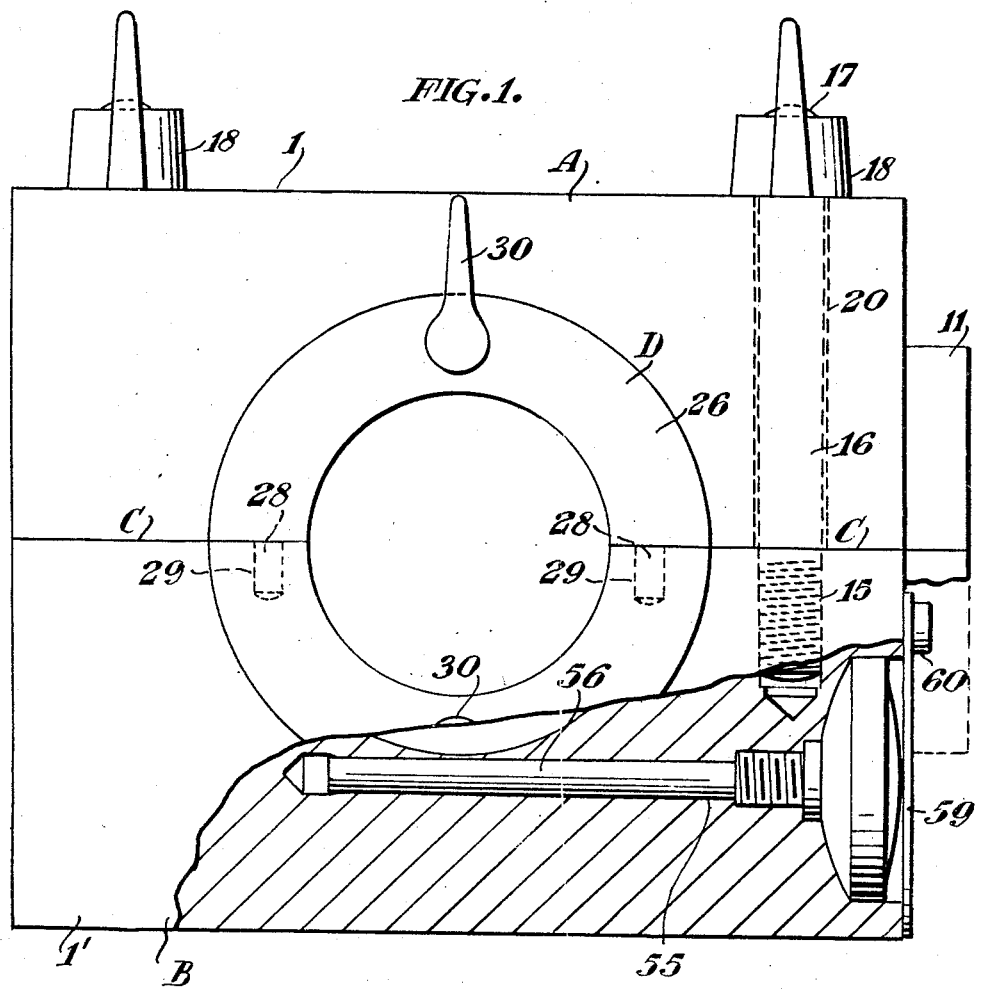

May 10, 1955 B. F. THORNE 2,707,803
MOULDS FOR THERMOPLASTIC MATERIALS
Filed Nov. 8, 1951 5 Sheets-Sheet 1

Inventor:
Beryl Freda Thorne;
By her attorneys,
Baldwin & Wight

May 10, 1955  B. F. THORNE  2,707,803
MOULDS FOR THERMOPLASTIC MATERIALS
Filed Nov. 8, 1951  5 Sheets-Sheet 5

Inventor:
Beryl Freda Thorne;
By her attorneys,
Baldwin & Wight

United States Patent Office 2,707,803
Patented May 10, 1955

2,707,803

MOULDS FOR THERMOPLASTIC MATERIALS

Beryl Freda Thorne, Lewisham, London, England, assignor to Telegraph Construction & Maintenance Company Limited, London, England, a company of Great Britain Application November 8, 1951, Serial No. 255,369

Claims priority, application Great Britain November 10, 1950

10 Claims. (Cl. 18—36)

This invention relates to moulds for thermoplastic materials and is concerned more particularly with moulds for jointing together two or more bodies of thermoplastic material by injecting molten thermoplastic material onto the surfaces thereof.

The invention is particularly, but not exclusively, concerned with moulds for jointing together electric cables or conductors insulated or sheathed with polythene.

In jointing operations of this kind it has already been proposed to enclose the ends of the thermoplastic objects to be jointed in a mould and, prior to the injection of the molten jointing material, to introduce into the mould a heated gas for the purpose of softening the ends of the thermoplastic objects to facilitate bonding with the jointing material.

Especially when a joint is being made in a thermoplastic cable sheath over a conductor or conductors having thermoplastic insulation, there is a danger that the stream of hot gas, entering under pressure through a single aperture, will detrimentally affect the core insulation adjacent the aperture, and it is an object of the invention to provide a construction of mould which will prevent this happening.

According to the present invention a mould for jointing together two or more bodies of thermoplastic material comprises an inner mould element adapted to fit over the end of the thermoplastic bodies to be jointed, a mould housing within which said inner mould element is mounted to revolve, ports for the admission of heating fluid in the inner mould element and the mould housing, a channel adapted normally to establish communication between said ports but capable of being sealed to permit the injection of thermoplastic material into the mould, said inner mould element being rotatable within the housing for the purpose of varying the point of entry of the heating fluid into the mould.

In one construction of mould according to the invention for jointing a sleeve of thermoplastic material over the end of the thermoplastic sheath of a cable to enclose a conductor joint, the inner mould element is formed in two mating brass halves to fit over the overlapping ends of the thermoplastic parts and to enclose within them an annular space which, when filled with thermoplastic moulding material, forms a sealing ring over the said overlapping ends. This inner mould element fits rotatably within the mould housing, made preferably of steel and likewise in two mating halves, within which the mould element is located against longitudinal displacement. A radial port is provided in both the mould element and the mould housing and, depending on the relative positions of the two elements, these ports either register with one another or communicate by way of an annular channel formed in the inner wall of the housing encircling the inner mould element. As a result, hot air or other gas can be introduced into the interior of the mould to soften the thermoplastic parts to be jointed, and by steadily rotating the mould within its enclosing housing the point of entry of this gas can be varied so as to break the direct blast of hot gas and to heat the whole of the thermoplastic surfaces uniformly. To permit escape of the gas from the mould an outlet port is provided in the inner mould element, which communicates with a second annular channel in the housing which in turn opens to atmosphere, this second channel being preferably interrupted adjacent its outlet to ensure the more positive exhaust of spent heating gas.

Means, consisting preferably of a pair of diametrically opposed finger pieces, may be provided to rotate the inner mould element within the housing, and means, for example wing nuts, are also provided to lock the two halves of the housing together.

The gas inlet ports to the inner mould element and mould housing are so constructed that when they are brought into register the nozzle of an injection gun or the like can be fitted, e. g. screwed, thereinto for the purpose of injecting molten thermoplastic material into the mould, and the nozzle acts simultaneously to seal the annular gas admission channel and thus to prevent the molten material being forced thereinto.

Figure 2:
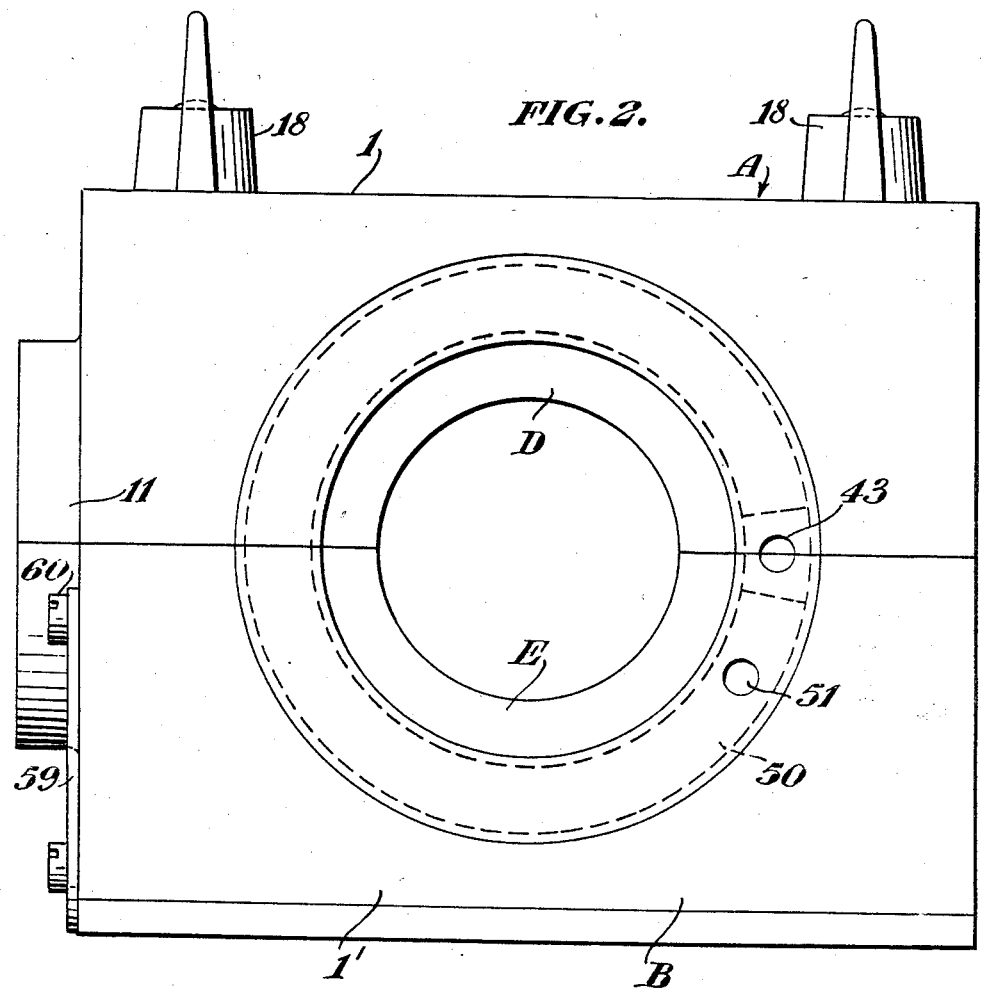
Figure 3:
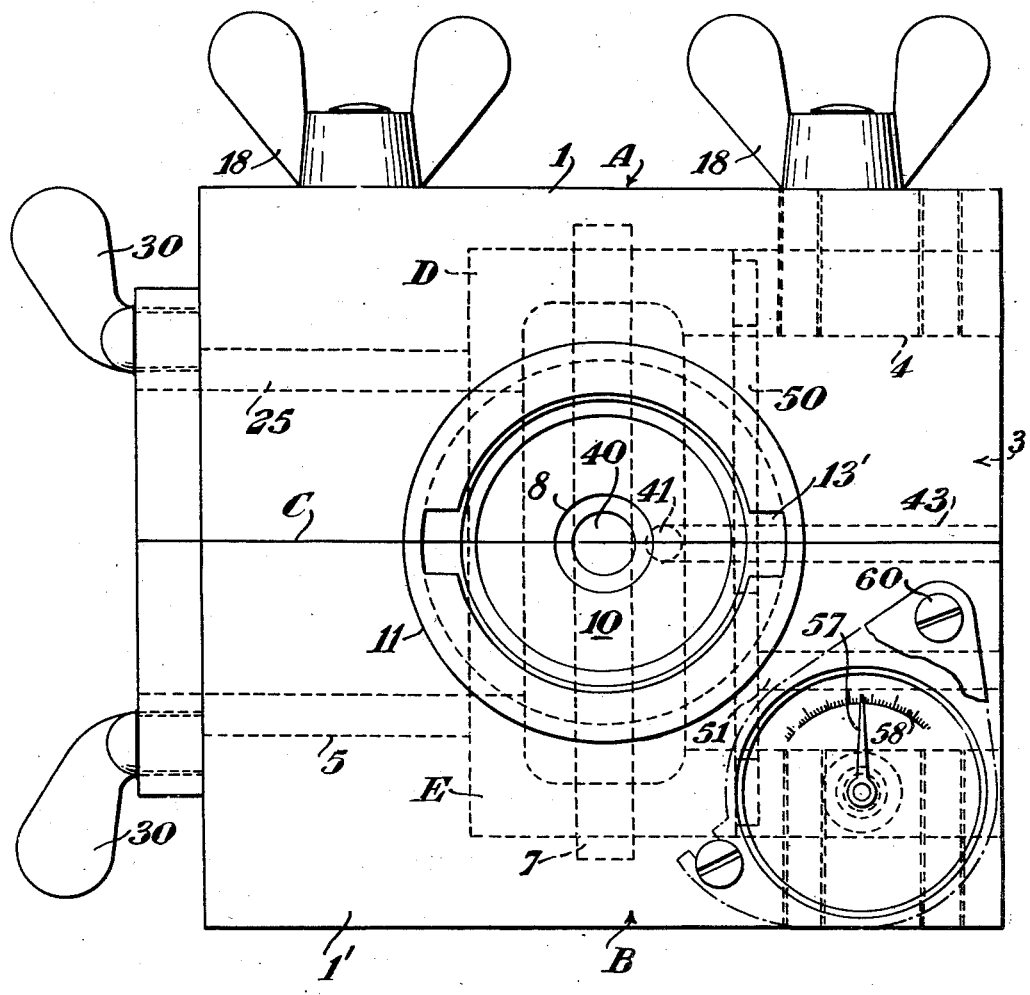
Figure 4:
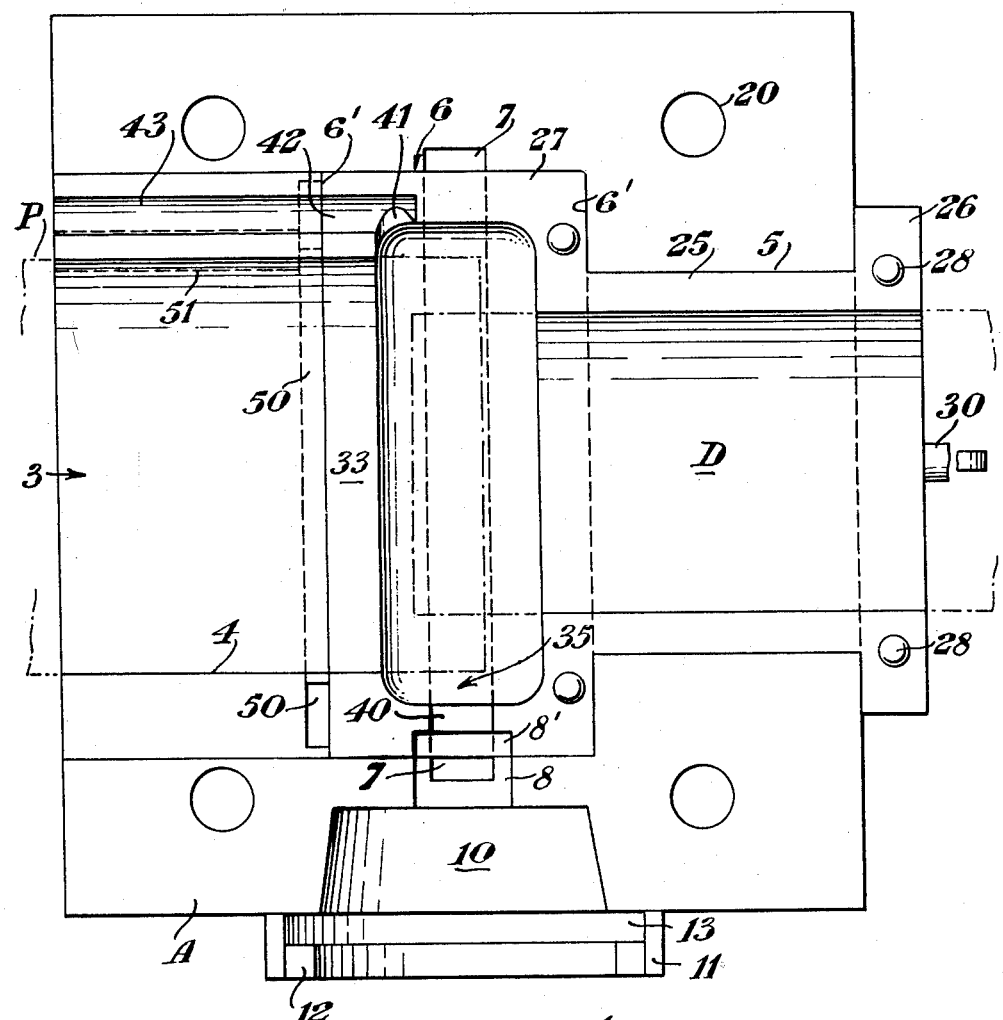
Figure 5:
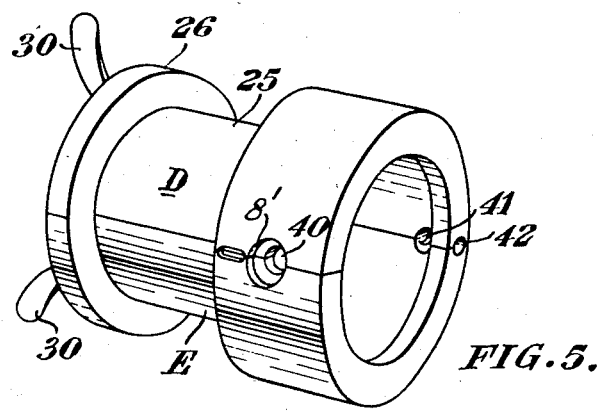
Figure 6:
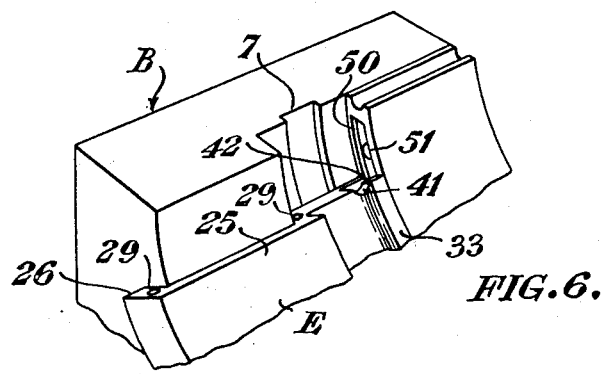
Figure 7:
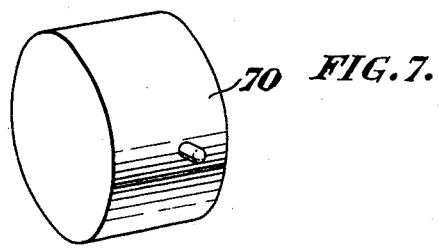

The invention is illustrated in the accompanying drawings as applied to a mould device intended primarily for jointing together electric cables or conductors in which Figures 1 and 2 are end elevations from opposite ends of the mould housing with the inner mould element or shell in position, Figure 1 showing the mould element from its driving end. Figure 3 is a side view of the mould device as seen from the right of Figure 1 and showing the admission ports for heating fluid and thermoplastic material. Figure 4 is a plan view of the upper half of the mould housing showing the associated mould tool or half shell in position. Figure 5 is a perspective view showing both parts of the mould tool element from the mould chamber end. Figure 6 is a part perspective view showing the bottom half of the mould housing with the mould tool in an intermediate position when being rotated, at which time the direct entry of heating fluid into the interior of the mould tool is prevented. Figure 7 is a detail view of a blanking piece for use when making a cable termination.

In the following description the use of the mould device will be described in the operation of completing a joint between two cable ends, it being understood that the conductors are first joined one to the other, following which it is necessary to finish off the joint by completing the insulation. For this purpose we make use of a sheath or layer of solid insulation, indicated at P. This sheath can either be threaded on one of the cable ends or conveniently it is positioned in the inner mould element before insertion of the cable ends to be united.

Referring to the drawings, the mould device of this invention essentially comprises a multiple part mould which in the embodiment illustrated consists of an upper and lower part generally indicated at A and B which divide along a central plane indicated at C to receive the inner mould element. Detachably mounted within the mould housing A, B is the inner mould element or shell comprising two complementary elements D, E, which enclose the cable end or ends during the jointing operation and in practice is termed the mould tool.

In the mould of this invention, the mould tool consisting of the elements D, E, is capable of rotation within the housing A, B.

The mould housing consists of two rectangular steel blocks 1, 1' through which is a central passage, indicated generally at 3, providing an opening 4 at one end to receive the cable end, or one of two cable ends to be jointed, and a bearing 5 which is of smaller diameter and in which the mould element is journalled to rotate. Intermediate the opening 4 and bearing surface 5 is an annular recess or chamber 6 having lateral faces 6' to receive the shouldered end of the mould element as hereinafter described. Extending circumferentially and centrally of the annular recess 6 is a groove 7 to provide a passage for the circulation of heating fluid, usually hot air, within the mould housing and the inner wall of which passage is provided by the periphery of the mould element so that gas in circulating through the passage will heat the outside of the mould element. As can be seen from Figure 4, the hot air passage opens into a port 8 located at the dividing plane C of the top and bottom halves A, B of the mould housing so that part lies in the housing and part 8' in the mould element. The port 8 in turn opens on one side into a tapered recess 10 intended for the insertion of a nozzle both for the injection of hot air and the thermoplastic material required to complete the joint between the two ends of the cable. At its other side the port 8 opens, as hereinafter described, into a port 40 giving access to the inside of the mould element.

In order to maintain the nozzle in position each half A, B of the mould housing is formed with a semi-circular flange 11 provided with a re-entrant lip 12 so that when the two parts of the housing are assembled with the end of a nozzle inserted in the recess 10, the nozzle, on which is provided engaging pins (not shown) will be locked by reason of the pins engaging the annular groove indicated at 13 formed between the lip 12 and the side face of the housing. Slots 13' (Figure 3) are provided in the lip 12 to enable the pins on the nozzle to be entered into the groove after the manner of a bayonet joint.

To permit of quick detachment and assembly of the two parts of the housing, the lower part of the mould is formed with tapped drillings 15 (Figure 1) for the insertion of screw studs 16 having screwed outer ends 17 to receive wing heads 18, corresponding holes 20 being provided in the upper part of the mould so that when the mould tool is in position, the two parts of the housing can be firmly clamped to each other.

Referring now to Figures 4 and 5 the mould tool or element comprises two semi-circular shells including a central neck portion 25 provided at one end with an outer locating flange 26 and at its other end with an inner flange or shoulder 27. As can be seen from Figure 4, the outer perimeter of the neck 25 of the mould element rides in the seating 5 of the mould housing while the inner flange or shoulder 27 is a flush fit in the annular recess 6 of the mould housing so that it effectively closes the open side of the groove 7 to form the hot air passage.

It will be understood that the part 27 of the mould element constitutes the joint forming mould proper for the introduction of the thermoplastic material while the remaining portions 25, 26 constitute in effect a hub or spindle by means of which the mould element is journalled to revolve in the bearing face 5 of the housing.

Locating studs 28 (Figure 1) are provided on the upper half tool element for engagement with corresponding holes 29 in the bottom tool element and to facilitate rotation of the tool element by hand as a unit in the housing, means such as finger pieces 30 are provided on both parts.

Formed in the shouldered end 27 of the mould element 2 is a counterbore 33 which is of the same diameter as the opening 4 in the mould housing so that when the parts are assembled it registers therewith, the size of the openings 4 and 33 being selected to correspond to the external diameter of the polythene or other outer sheath of the cable indicated generally at P in Figure 4. The counterbore 33 in the mould element is formed at its inner end with a peripheral recess 35 so as to provide between the inner face of the mould element and the outer sheath P of the cable end, when in position, an annular space or mould cavity, into which hot air is first admitted to soften the sheath and subsequently when the sheath and surrounding insulation of the cable ends have been sufficiently softened, is filled, by injection, with insulation (polythene) to complete the joint between the cable ends as will be hereinafter described.

Access to the peripheral space or mould cavity 35 of the mould tool is by means of the port 40 which merges with the part 8' of the port 8 of the mould housing, the part 8' providing a shoulder against which the end of the injection nozzle is seated when injecting insulation material.

In the normal position of the parts, the entrant part 8' to the port 40 registers with the port 8 in the mould housing and it is in this position that the end of the injection nozzle for injecting insulation material into the peripheral recess 35 is inserted, the nozzle itself sealing off the hot air passage 7.

As can be clearly seen from Figure 4, when the parts are in their normal position and assuming a hot air supply nozzle has been fitted to the mouth 10 of the housing, hot air has direct admission through the ports 8—8' and 40 to the interior of the mould element where it will find its way around the polythene sheath with the object of heating the same until it is thermoplastic: at the same time it penetrates by means of the hot air passage 7 around the exterior of the mould proper 27 to heat up the mould element.

To ensure that the hot air will circulate around and through the space 35, an escape or bleed port 41 is provided on the side opposite the inlet port 40, which port 41 has a lateral opening 42 that registers when the parts are in their normal position with a transverse bleed hole 43 in the mould housing. It follows, therefore, that when hot air is passed into the mould to heat it up that the air can escape through the ports 41 and passages 42, 43 to atmosphere. Also when the hot air nozzle has been removed and the injection nozzle inserted in its place, this escape port will permit the through flow of thermoplastic material so as to ensure that the mould chamber, as provided by the space 35, will be completely filled with insulation material.

It will be appreciated that, should the mould tool be allowed to remain in the one, i. e. the normal position during such time as is required for the entire polythene sheath and the mould itself to become heated up to the temperature at which the polythene becomes plastic the polythene immediately adjacent the point of entry of the hot air to the mould chamber 35, i. e. at that point opposite the ports 8—8' and 40 will heat up more rapidly than that at points remote therefrom. This will not only cause localised overheating but do damage to the core insulation adjacent this point and in making the joint of this invention, therefore, the mould tool is caused to rotate so as to ensure even heating up around the perimeter of the sheath P and of the mould itself. Immediately, therefore, the supply of hot air has been turned on, the mould tool is caused to rotate slowly by turning the tool by means of the finger pieces 30 when the port 40 will move out of alignment with the port 8 in the mould housing. The hot air will now continue to pass into the hot air passage 7 impinging against the outer face of the mould chamber 27. As the tool rotates, hot air still continues to enter the interior mould space 35 by passing from the passage 7 through the port 40.

It will be appreciated that immediately the mould tool starts to rotate, the outlet passage 42 connecting with the escape port 41 moves out of alignment with the bleed hole 43 in the mould housing.

In order to prevent pressure building up in the chamber 35 and to ensure a continuous flow thereto of hot air, there is provided in the adjacent lateral face 6' of the recess 6 of the housing a circumferential passage 50 with an associated outlet passage 51 through which the hot air will now pass until such time as passage 42 again registers with bleed hole 43.

To enable the operator to ascertain the temperature of the housing, the lower part of the mould may be provided with a transverse bore 55 (Figure 1) to receive the stem 56 of a thermometer which, for convenience, is of the rotary (dial) type so that it can easily be read, the temperature being read by means of a pointer 57 against a dial 58 as can be seen from Figure 3. 59 is a cover plate which is mounted to swing about a stud 60 so that when not required the thermometer can be totally enclosed to prevent damage to the dial.

In operation, the upper half A of the mould housing is removed together with the associated tool element D when the two cable ends to be jointed to one another are positioned in the bottom tool section, one of the cable ends being laid in the interior of the neck portion 25 of the tool element and the end of the other cable, over which is first placed a polythene sheath, is inserted in the other side of the half mould by laying the polythene sheath to complete the insulation in the mouth 4 with the sheath extending across the mould chamber 35 as indicated in dot-and-dash lines in Figure 4. When both cable ends, the respective conductors of which have been united one to the other, and the polythene sheath are in position, the upper half of the mould and associated tool section is replaced and the clamping nuts 18 tightened up.

The hot air nozzle is now introduced into the recess 10 of the mould of the housing and the hot air supply turned on to introduce hot air both to the interior of the mould chamber 35 and the exterior surface thereof, the air for this purpose circulating around the passage 7, it being understood that at the commencement of the operation the position of the mould element is such that the ports 40 and 8—8' are in alignment with one another.

At the outset the hot air passing into the interior mould chamber 35 will escape via the escape port 41 and passages 42, 43 to atmosphere. Immediately, however, the tool element is caused to revolve in order to prevent localised overheating of the polythene sheath, the hot air, while still continuing to circulate around the passage 7, will pass therefrom into the interior chamber 35 which always remains in direct communication with passage 7 via port 40.

It will be appreciated, however, that at no time does the ingoing jet of hot air remain stationary opposite any one area of the perimeter of the polythene sleeve P but as the tool element is slowly revolved, it will circulate over the entire surface thereof. During this time the outflow of hot air from the chamber 35 will continue but instead of the escape passage being from the port 41 and passage 42 via bleed hole 43, it will then take place through the port 41, passage 42 via the annular passage 50 and thence through the second outlet 51 in the housing, until such time as the escape port 41 in the mould body 27 proper again registers with the passage 43. When the temperature within the mould housing is sufficient to render the polythene thermoplastic, which can be judged by reference to the thermometer 56, the hot air nozzle is disconnected and an injection nozzle for the supply of thermoplastic material placed in the mouth 10, it being understood that the head of this nozzle has a reduced end to fit the port 8—8' so as to seal off the entrance to the air passage 7, the ports 8—8' again being brought into alignment upon completion of the heating operation and when the required temperature registers on the thermometer showing that the polythene sheath is thermoplastic.

As can be seen from Figure 4, the insertion of this nozzle into the inner part 8' of the port 8—8' automatically cuts off the hot air passage 7 so that the insulation material, which is in a plastic state cannot pass into the outer hot air passage 7 but will flow directly into the mould chamber 35 until it completely fills the same. When the chamber is full the insulation material will start to flow out through the bleed hole 43 signifying that the joint is completely filled. The injection nozzle is now removed and the joint allowed to cool off in the usual manner.

As shown in Figure 7, a blanking-off piece 70 is provided for insertion in the mould passage 4 to blank off one end of the mould when using the same for making a termination on a cable end.

I claim:

1. A mould device for making a welded joint of thermoplastic material comprising a relatively stationary mould housing, an inner mould element for enclosing an article to which the weld of thermoplastic material is to be made, said mould housing having an inner chamber within which the mould element is mounted to revolve, entrant ports both in the mould housing and mould element by which a heating fluid can be admitted both to the interior of the mould element and the chamber within which it revolves, and means for rotating the mould element to vary the point of entry of the heating fluid thereinto.

2. A mould device for making a welded joint between two cables having a thermoplastic insulation comprising an inner mould element adapted to receive the ends of the cable between which a welded thermoplastic joint is to be made, a relatively stationary mould housing within which the mould element is capable of rotation during the jointing operation, ports both in the housing and said mould element for admission of a heating fluid to the interiors thereof, said ports normally being radially aligned with each other, a passage within the housing by which the interior of the mould element, on rotation, is maintained in fluid communication with said port of said housing when the latter port is connected to a supply of heating fluid, and means for rotating the mould element within the housing to vary the point of entry of the heating fluid to the interior of the mould.

3. A mould device as set forth in claim 2 in which the mould housing is in two parts and comprises a longitudinal passage having an annular recess to receive the mould element, in which recess is the admission port.

4. A mould device as set forth in claim 3 in which the mould element comprises two semi-cylindrical components and includes a neck portion and at least one locating flange by means of which said element is mounted to revolve within the annular recess in the housing.

5. A mould device as set forth in claim 4 in which the annular recess in the mould housing is formed with a peripheral groove for circulation of heating fluid, which groove is open to the admission port in the housing.

6. A mould device as set forth in claim 4 in which the mould element comprises an interior mould chamber having a radial admission port adapted normally to register with the admission port in the mould housing.

7. A mould device as set forth in claim 6 in which the mould chamber is provided with an escape port adapted only in predetermined relative positions of the parts to register with a bleed hole in the housing.

8. A mould device as set forth in claim 7 comprising a mould housing wherein the annular recess is formed in one wall with a lateral groove with which the escape port in the mould element registers on rotation thereof.

9. A mould device for making a welded joint of thermoplastic material comprising a mould housing, an inner mould element having a mould cavity for enclosing an article to which the weld of thermoplastic material is to be made, said mould housing having an inner chamber within which the mould element is mounted to revolve, an entrant port in the mould housing adapted to receive an injection nozzle respectively for feeding a heating medium and for introduction of thermoplastic material when the joint forming portion of the article has been rendered plastic, a second entrant port in the mould element for the introduction of thermoplastic material to the mould cavity only when said ports respectively in the mould housing and mould element are in registration, and means for rotating said mould element within the housing so that when the injection nozzle is in position the heating fluid on discharge therefrom will circulate through the mould chamber and over the exterior surface of the mould element.

10. A mould device for making a welded joint between two cables insulated with a thermoplastic material comprising an inner mould element having a mould cavity adapted to receive the ends of the cable between which a welded thermoplastic joint is to be made, a mould housing having a mould chamber, within which the mould element is capable of rotation during the jointing operation, said mould chamber providing a passage extending circumferentially between the housing and the mould element to enable circulation of heating fluid around the mould element, an entrant port in the mould housing by which fluid can be fed to said passage, a second port in the mould element normally in communication with said first port and by means of which insulation material can be introduced into the mould cavity on insertion of an injection nozzle into the mouth of said second port when the insulation on the cable ends has been softened, and means for causing rotation of the mould element with respect to the mould housing so that the heating fluid, before entering the mould cavity, will flow through the circumferential passage to prevent localized heating of the cable ends and cable insulation.

References Cited in the file of this patent
UNITED STATES PATENTS

| | | |
|---|---|---|
| 425,680 | Lamm | Apr. 15, 1890 |
| 568,298 | Croskey et al. | Sept. 22, 1896 |
| 2,357,998 | Campbell | Sept. 12, 1944 |
| 2,536,692 | Miller | Jan. 2, 1951 |